United States Patent
Hawthorn et al.

(10) Patent No.: US 6,883,831 B2
(45) Date of Patent: Apr. 26, 2005

(54) APPARATUS AND METHOD FOR CONTROLLING AN INFLATABLE CUSHION

(75) Inventors: Laura A. Hawthorn, Tipp City, OH (US); Stephanie L. Dunkle, Springboro, OH (US); Ryan T. Pinsenschaum, Vandalia, OH (US)

(73) Assignee: Delphi Technologies, Inc., Troy, MI (US)

( * ) Notice: Subject to any disclaimer, the term of this patent is extended or adjusted under 35 U.S.C. 154(b) by 107 days.

(21) Appl. No.: 10/361,162

(22) Filed: Feb. 6, 2003

(65) Prior Publication Data

US 2004/0155438 A1 Aug. 12, 2004

(51) Int. Cl.⁷ ............................................... B60R 21/28
(52) U.S. Cl. ...................................... 280/739; 280/743.2
(58) Field of Search .......................... 280/728.2, 728.3, 280/730.1, 732, 739, 742, 743.1, 743.2

(56) References Cited

U.S. PATENT DOCUMENTS

| | | | |
|---|---|---|---|
| 4,186,941 A | 2/1980 | Scholz et al. | 280/743 |
| 5,004,266 A | 4/1991 | Miller et al. | 280/743 |
| 5,048,863 A | 9/1991 | Henseler et al. | 280/743 |
| 5,249,825 A | 10/1993 | Gordon et al. | 280/743 |
| 5,310,215 A * | 5/1994 | Wallner | 280/739 |
| 5,395,134 A | 3/1995 | Gunn et al. | 280/743 |
| 5,405,166 A * | 4/1995 | Rogerson | 280/739 |
| 5,533,755 A | 7/1996 | Nelsen et al. | 280/743 |
| 5,630,614 A | 5/1997 | Conlee et al. | 280/730 |
| 5,669,632 A | 9/1997 | Johnson et al. | 280/743 |
| 5,755,459 A * | 5/1998 | LaLonde | 280/728.3 |
| 5,765,867 A | 6/1998 | French | 280/743 |
| 5,791,685 A | 8/1998 | Lachat et al. | 280/743 |
| 5,806,881 A | 9/1998 | Richter et al. | 280/730 |
| 5,865,466 A | 2/1999 | Yamamoto | 280/743 |
| 5,887,894 A | 3/1999 | Castagner et al. | 280/743 |
| 5,954,361 A | 9/1999 | Lang | 280/743 |
| 6,017,058 A | 1/2000 | Ross | 280/743 |
| 6,070,904 A | 6/2000 | Ozaki et al. | 280/743 |
| 6,161,866 A | 12/2000 | Ryan et al. | |
| 6,164,696 A | 12/2000 | Ellerbrok et al. | 280/743 |
| 6,203,061 B1 | 3/2001 | Niederman et al. | |
| 6,206,409 B1 | 3/2001 | Kato et al. | 280/728 |
| 6,213,502 B1 | 4/2001 | Ryan et al. | |
| 6,247,726 B1 | 6/2001 | Ryan | |
| 6,371,517 B1 | 4/2002 | Webber et al. | |
| 6,390,501 B1 | 5/2002 | Greib et al. | |
| 6,422,597 B1 | 7/2002 | Pinsenschaum et al. | |
| 6,431,596 B1 | 8/2002 | Ryan et al. | |
| 6,439,603 B1 | 8/2002 | Damman et al. | |
| 6,499,765 B1 | 12/2002 | Hawthorn et al. | |
| 6,561,545 B1 | 5/2003 | Greib et al. | |
| 6,592,146 B1 | 7/2003 | Pinsenschaum et al. | |

FOREIGN PATENT DOCUMENTS

JP 2000016213 A * 1/2000 ........... B60R/21/20

* cited by examiner

*Primary Examiner*—Peter C. English
(74) *Attorney, Agent, or Firm*—Scott A. McBain

(57) ABSTRACT

An airbag module for restraining an occupant of a vehicle, comprising: a housing; an inflatable cushion being capable of being stored in an un-deployed position in the housing, the inflatable cushion having at least one vent opening disposed on an inboard side and an outboard side of the inflatable cushion, the outboard side being positioned closer to an exterior portion of the vehicle than the inboard side; an inflator for inflating the inflatable cushion, the inflator being in fluid communication with the inflatable cushion; and a biasing device being configured to restrict the deployment of the inflatable cushion in a first direction while allowing for deployment of the inflatable cushion in an inboard direction and an outboard direction, the outboard direction being towards an exterior portion of the vehicle and the inboard direction being opposite to the outboard direction, the biasing device restricts the deployment of the inflatable cushion when a portion of the biasing device makes contact with the occupant of the vehicle.

13 Claims, 4 Drawing Sheets

US 6,883,831 B2

APPARATUS AND METHOD FOR CONTROLLING AN INFLATABLE CUSHION

TECHNICAL FIELD

This disclosure relates generally to airbags for vehicles. Specifically, this disclosure relates to systems and methods for controlling the deployment and venting of an inflatable cushion of an airbag module.

BACKGROUND

The present disclosure is related to U.S. Pat. Nos. 5,004, 266; 5,630,614 and 5,765,867 the contents of which are incorporated herein by reference thereto.

Airbag modules have become common in modern automobiles. An airbag module typically comprises an inflatable cushion and an inflator within a housing. The module is installed in a desired position within the vehicle, such as the steering wheel, the dashboard, the seat, the A-pillar, and other locations. The inflatable cushion is stored in a folded position within the housing in fluid communication with the inflator. In response to an activation event or occurrence, a sensor or sensing device provides a signal for activating the inflator. The inflator then provides a supply of inflating gas to the cushion deploying it from the housing.

Various methods have been employed to more closely tie the inflation level of the inflatable cushion to specific conditions. For example, dual stage inflators have been used to increase or decrease the level of inflation of the inflatable cushion. Alternatively, variable venting schemes have been used to direct a portion of a generated inflation gas away from the cushion. Further, variable tethering systems have been used to restrict or vary the overall cushion volume.

SUMMARY

The present disclosure provides a bias apparatus which biases the airbag when the bias apparatus is restricted or blocked, such as by a vehicle occupant. Advantageously, when the bias apparatus is not restricted, the bias apparatus immediately opens out of the way to allow the airbag to deploy in a manner wherein it is unrestrained and unguided by the biasing apparatus.

A biasing device for use with an airbag module having an inflatable cushion with at least one vent opening for restraining an occupant of a vehicle, the biasing device comprising: a first biasing flap; a second biasing flap, each being secured to the airbag module at one end and overlapping each other at another end, the first biasing flap and the second biasing flap are disposed about the inflatable cushion when it is stored in the airbag module in an un-inflated state, the first biasing flap and the second biasing flap deploy out of the airbag module prior to the inflatable cushion and the at least one vent opening is unblocked by the biasing device; wherein the first biasing flap and the second biasing flap restrict the deployment of the inflatable cushion in a first direction while allowing for deployment of the inflatable cushion in an inboard direction and an outboard direction, the outboard direction being towards an exterior portion of the vehicle and the inboard direction being opposite to the outboard direction, when a portion of the biasing device makes contact with the occupant of the vehicle prior to the inflatable cushion being fully inflated.

An airbag module for restraining an occupant of a vehicle, comprising: a housing; an inflatable cushion being capable of being stored in an un-deployed position in the housing, the inflatable cushion having at least one vent opening disposed on an inboard side and an outboard side of the inflatable cushion, the outboard side being positioned closer to an exterior portion of the vehicle than the inboard side; an inflator for inflating said inflatable cushion, said inflator being in fluid communication with said inflatable cushion, said inflator providing an inflation gas for inflating said inflatable cushion after receiving an initiation signal from a sensing and diagnostic module; and a biasing device being configured to restrict the deployment of the inflatable cushion in a first direction while allowing for deployment of the inflatable cushion in an inboard direction and an outboard direction, the outboard direction being towards an exterior portion of the vehicle and the inboard direction being opposite to the outboard direction, the biasing device restricts the deployment of the inflatable cushion when a portion of the biasing device makes contact with the occupant of the vehicle; wherein the biasing device causes lateral deployment in the inboard direction and the outboard direction and venting through the inboard side and the outboard side of the inflatable cushion at a time after the initiation signal is received by the inflator, the time being shorter than if the biasing device does not restrict the deployment of the inflatable cushion.

A method for modifying the deployment characteristics of an inflatable cushion in a vehicle, comprising: positioning a biasing device about the inflatable cushion in an un-inflated state, the biasing device comprising a first biasing flap and a second biasing flap each overlapping each other to provide an overlapping portion positioned over a portion of the inflatable cushion; inflating the inflatable cushion with an inflator in fluid communication with the inflatable cushion, the inflator providing an inflation gas for inflating the inflatable cushion after receiving an initiation signal from a sensing and diagnostic module; and restraining the deployment of the inflatable cushion in a first direction while allowing for deployment of the inflatable cushion in an inboard direction and an outboard direction, the outboard direction being towards an exterior portion of the vehicle and the inboard direction being opposite to the outboard direction, the biasing device restricts the deployment of the inflatable cushion when the overlapping portion makes contact with the occupant of the vehicle, the biasing device causes lateral deployment in the inboard direction and the outboard direction and venting through the inboard side and the outboard side of the inflatable cushion at a time after the initiation signal is received by the inflator, the time being shorter than if the biasing device does not restrict the deployment of the inflatable cushion.

The above-described and other features of the present disclosure will be appreciated and understood by those skilled in the art from the following detailed description, drawings, and appended claims.

DRAWINGS

DESCRIPTION

Figure 1:
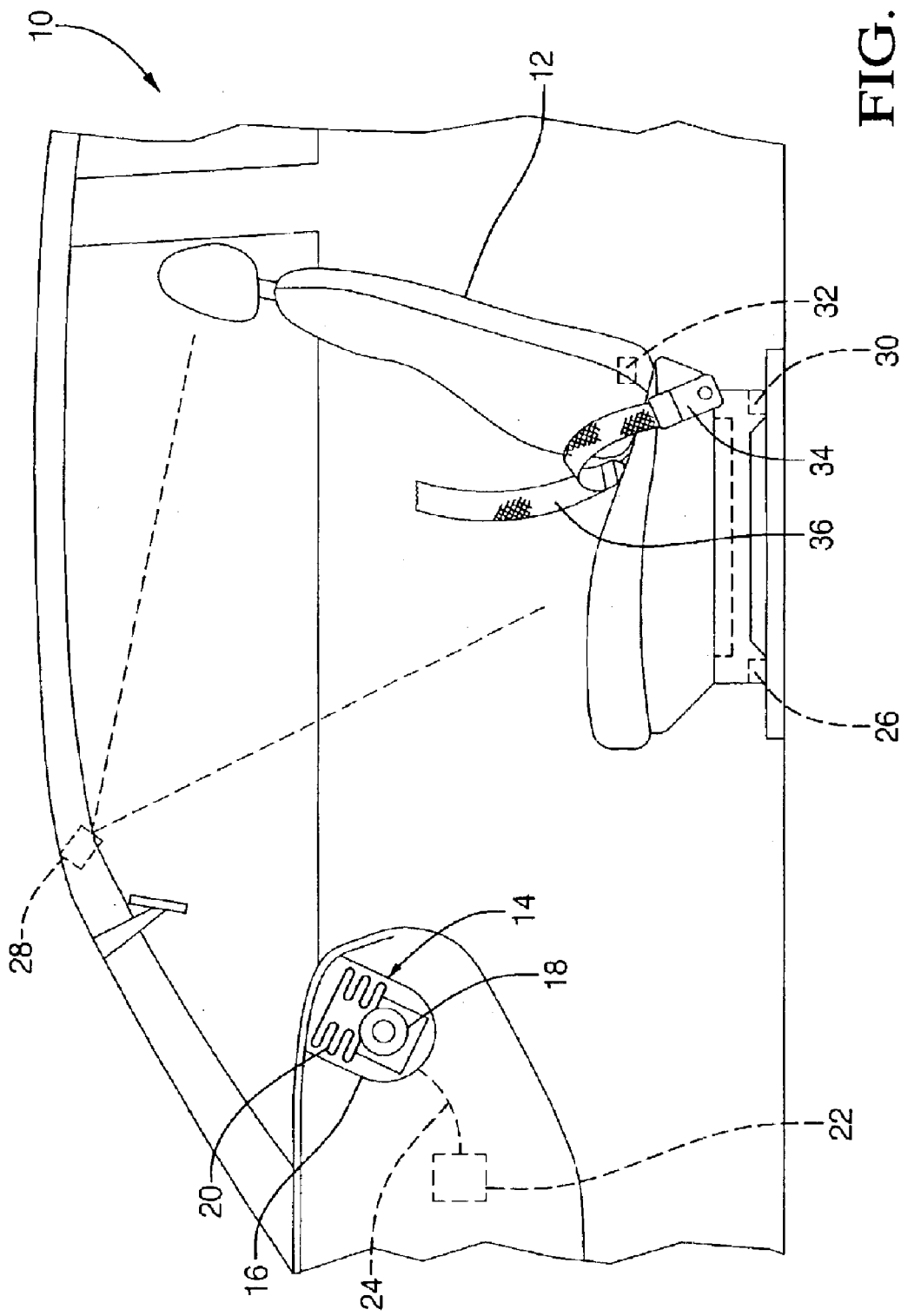
FIG. 1 is a partial view of a vehicle interior showing an airbag cushion in a stored or undeployed state.

Referring now to the Figures, and in particular to FIG. 1 a portion of an interior of a vehicle 10 is illustrated. Included in the interior compartment of vehicle 10 is a seating structure 12 and an airbag module 14 disposed in a selected spatial relationship with respect to seating structure 12. The airbag module 14 comprises a housing 16, an inflator 18, and an inflatable airbag or cushion 20. The module 14 is positioned in the vehicle 10 for deployment of the cushion 20 towards the seating structure 12.

A sensor or sensing-and-diagnostic module 22 is adapted to detect an activation event wherein the occurrence of a threshold event will cause an activation signal 24 to be generated and received by the inflator 18, thereby causing the inflator to inflate the inflatable cushion. The detection of the threshold event is determined by one or more sensors that are disposed about the vehicle in accordance with known technologies. Thus, the activation signal 24 controls the activation of the airbag module 14.

The inflatable cushion is stored in a folded or undeployed position in housing 16. The cushion is positioned to be in fluid communication with the inflator 18 wherein generation of the inflating gas will cause the cushion to inflate. Upon detection of an activation event by the sensing-and-diagnostic module 22, the inflator 18 is activated via a signal generated by the sensing and diagnostic module to generate the inflation gas. The inflation gas causes the cushion 20 to inflate and expand from housing 16 into the interior of the vehicle. It should be recognized that module 14 is illustrated by way of example only as being included in the dashboard of the vehicle. Of course, it is contemplated that module 14 can be installed for deployment in other regions of the vehicle, such as, but not limited to the steering wheel, the seat, the A-pillar, the roof, and other locations as well as other angular or positional relationships illustrated in FIG. 1.

Additionally, the present disclosure is also contemplated for use with various types of inflatable cushions and inflators. For example, cushions which are folded in a particular manner to achieve various deployment configurations and various types of inflators (e.g., dual stage inflators).

In addition, and in accordance with the present disclosure, the sensing-and-diagnostic module can also be adapted to detect one or more conditions of the seating structure. For example, sensing-and-diagnostic module 22 can be adapted to detect one or more of the following: a load or amount of load (e.g., occupant weight) on the seating structure 12, a position of the seating structure, an angle of a portion of the seating structure with respect to another portion, the distance the seating structure is from the airbag module 14, and other data that is relevant to the deployment of the airbag by receiving input from a plurality of sensors disposed about the vehicle.

For example, the sensing-and-diagnostic module can receive inputs from one or more sensors such as, but not limited to, a seat position sensor 26, an optical scanner 28, a load sensor 30, a seat recline sensor 32, a seat belt use detection sensor 34, and a belt tensioning sensor (not shown). The sensors are positioned to provide input signals to module 22 indicative of one or more seat conditions.

The one or more seat conditions combined with an occupant's size (e.g., weight determined by sensors) is inputted in a control algorithm resident upon a microprocessor disposed within the sensing and diagnostic module in order to determine a desired deployment scheme for the inflatable cushion. For example, the data inputs when compared to a look up table stored in the memory of the microprocessor or other readable format will allow the algorithm to determine whether a full deployment or partial deployment of the airbag is desired (e.g., tailoring of the airbag module by activating or not activating a system designed to modify the cushion deployment characteristics). The continuous sampling of the various sensors allows the sensing and diagnostic module to determine before an activation event (deployment) what type of deployment is desired.

It is noted that the flap arrangement of the present disclosure is contemplated for use along or in any combination of the aforementioned sensors and the present disclosure is not intended to be limited by the specific types of sensors discussed above. For example, the system is capable of operating with a single sensor input (e.g., occupant weight) or a multitude of inputs (e.g., occupant weight, seat position, seat belt operation, occupant height, etc.). Thus, any combination of sensors and sensor inputs may be used in order to assist with the deployment of the airbag.

The seat position sensor detects the position or distance of seating structure 12 with respect to airbag module 14. Similarly, the optical scanner 28 can be used to detect the position of seating structure 12. The load sensor 30 is disposed within the seating structure 12 and can be used to detect the load on the seating structure. Thus, sensor 30 is capable of detecting the specific weight or load on a portion of seating structure 12. The seat recline sensor 32 can be used to detect the degree or angle to which an upper or back portion of the seating structure 12 is reclined or positioned with respect to a lower or seat portion of seating structure 12. The seat belt use detection sensor 34 can determine whether the seat belt 36 is secured (e.g., buckled is inserted into its corresponding clasp). The seat belt tensioning sensor, alone or in combination with the load sensor 30, can also be used to determine the load on the seating structure 12.

An exemplary embodiment of an airbag module for use with the present disclosure is illustrated in FIGS. 2–6. As will be described in detail below, airbag module 14 comprises means to customize or tailor the inflation level and venting of the inflatable cushion 20. The inflation level or cushion deployment range is commensurate with specific interaction with a biasing flap arrangement of the present disclosure.

Figure 2:
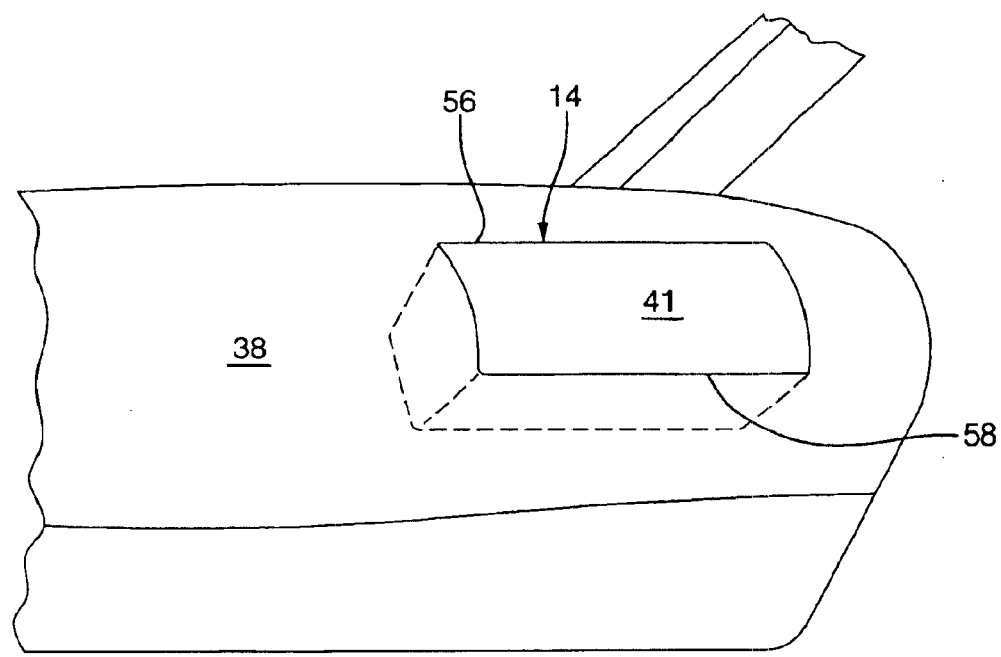
FIG. 2 is another partial view of a vehicle interior showing an airbag cushion in a stored or undeployed state.

Referring to FIG. 2, airbag module 14 is illustrated as a contemplated configuration for use as a passenger side airbag module mounted beneath an instrument panel 38. Of course, the present disclosure is also contemplated for use with a driver's side airbag module, which is typically mounted on a vehicle steering wheel. The driver's side module and passenger side module are each normally covered by a cover door, indicated at 41 for the passenger side module 14 in FIG. 2. However, for clarity of the invention, the cover door is not shown in the remainder of the Figures.

Figure 3:
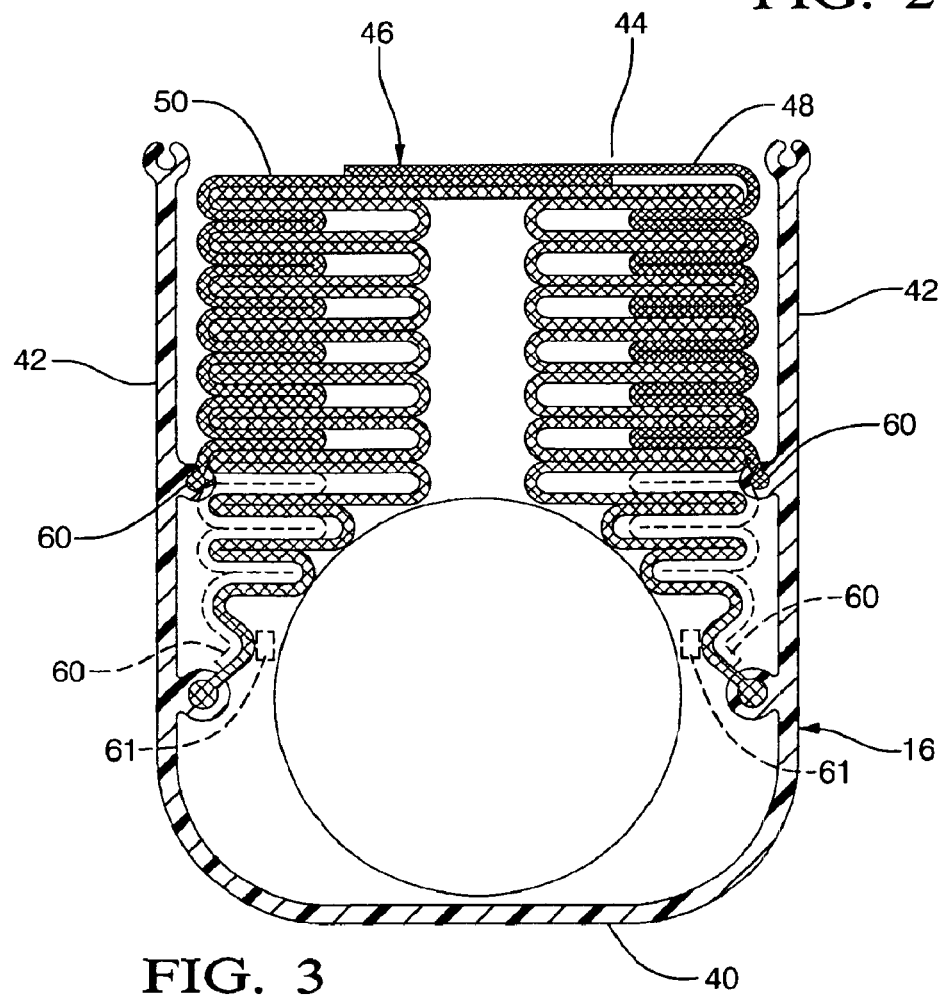
FIG. 3 is a cross-sectional view of a portion of an airbag module with a biasing device.

Referring now to FIG. 3, a cross-sectional view of a passenger side module constructed in accordance with the present disclosure is illustrated. Here housing or canister 16, being made of a metallic or other suitable material, has a bottom wall 40 and upstanding sidewalls 42 cooperatively defining a canister opening 44. The passenger side module further comprises airbag or inflatable cushion 20, inflator 18 for generating gas to inflate the airbag, and a biasing device 46 for biasing the airbag under certain conditions.

The passenger side module is located beneath an instrument panel opening normally closed by the cover door. The cover door preferably includes weakened portions (not shown) so that the inflating airbag forces open the cover door during deployment. The cover door shown in FIG. 2 is merely for illustration purposes and it will be appreciated that the biasing device of the present disclosure may be used in conjunction with any cover door design having any tear pattern.

The generally cylindrical inflator of the passenger airbag module is mounted within the canister or housing. The inflator may be of any conventional construction for generating gas to inflate the airbag upon sensing certain predetermined vehicle conditions. The airbag is formed of a suitable fabric material and is normally stored within the canister or housing in a folded condition atop the inflator.

The airbag is suitably attached to the canister or inflator, in any typical manner known in the art to anchor the airbag during deployment. For example, a retainer ring or retainer with a plurality of mounting studs is configured to be inserted in the mouth of the airbag and provide a means for securing the airbag to the module wherein the mouth of the airbag is in fluid communication with the inflator.

Figure 4:
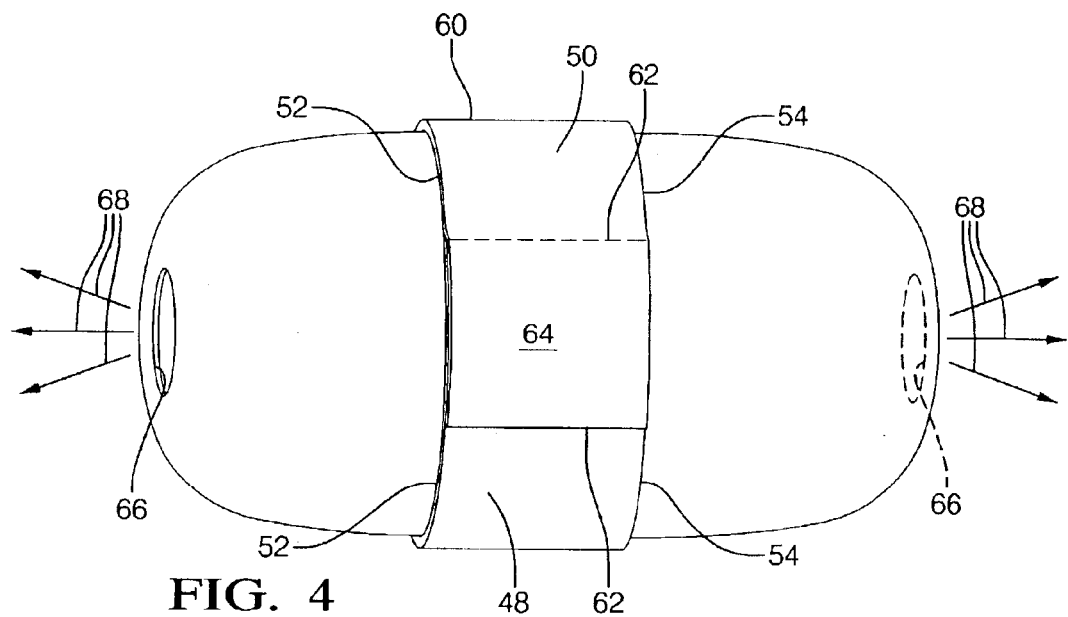
FIG. 4 is a front view of a deployed airbag having side vent apertures and being restrained by a biasing device.

The biasing device includes a first bias flap 48 and a second bias flap 50. The first and second bias flaps are formed completely independent and separate from each other. The bias flaps are preferably each made of a flat sheet of fabric or other flexible material. Referring now to FIG. 4, the biasing device has a laterally inboard side 52 toward the center of the vehicle interior and an opposite laterally outboard side 54 facing towards an exterior side of the vehicle. The first bias flap extends from an upper side 56 of the passenger side module and the second bias flap extends from a lower side 58 of the passenger side module. The upper side is defined as being closer to the vehicle windshield and the lower side is defined as being farther away from the windshield. The bias flaps each have a fixed edge 60 fixedly attached with respect to the vehicle and each have a free edge 62 opposite the fixed edge. The fixed edges of the bias flaps are suitably attached to any one of the following: the canister or housing, the inflatable cushion, the retainer device (e.g., retainer ring) or the cover door or any other suitable location to prevent movement during deployment of the airbag. In an exemplary embodiment, the ends of the biasing flaps are sewn on opposite sides of the mouth of the airbag. Thus, fixed edge 60 would be located proximate to the location illustrated by the dashed lines in FIG. 3. In this embodiment, the flaps are sewn to the airbag first and then a retainer device 61 for securing the airbag to the housing is inserted into the mouth of the airbag and then the retainer and the airbag and biasing flaps are secured to the housing.

Alternatively, the ends of the biasing flaps are secured to the retainer in a similar fashion as the airbag for example, passing studs of the retainer through openings in the biasing flaps. In this embodiment the retainer is inserted into the mouth of the airbag and the biasing flaps with holes for receiving the studs of the retainer are secured to the retainer prior to the studs of the retainer being secured to the housing. The securement of the retainer and retainer studs, bolts or rivets to the housing is performed in accordance with methods known to individuals skilled in the art.

In yet another alternative, the flaps are secured to the housing, for example and as illustrated in FIG. 3.

Once the biasing flaps are in their preferred pre-deployment position, the bias flaps are generally located above and overlying the airbag, but beneath the cover door. Thus, besides biasing the airbag, the bias flaps also provide a layer between the airbag and the cover door prior to and during airbag inflation.

Referring now to FIG. 4, the bias flaps are each of a sufficient length that they cooperatively define an overlapped portion 64 when they are extended from the upper and lower sides towards the other flap. The overlap portion is located atop the airbag prior to inflation and during inflation such that the inflating airbag is laterally biased in both the inboard and outboard directions when the overlapped portion is restricted from separating and the inflating airbag is restrained from an inward (towards vehicle seat) direction. In accordance with an exemplary embodiment of the present disclosure the restriction of the overlapped portion is achieved when an occupant interacts with the overlapped portion and providing a sufficient amount of force to prevent the first and second bias flaps from separating as the cushion is inflating.

In addition, and in accordance with an exemplary embodiment of the present invention, at least a pair of side vent apertures 66 are positioned (one on each side of the lateral edges of the cushion extending towards the inboard and outboard sides) to allow for venting of the inflation gases of the inflatable cushion at an earlier time (with respect to the inflation of the airbag by the generation of an inflation signal by the sensing and diagnostic module) and at a greater flow rate than if the airbag were to inflate without restriction by the biasing device. The location of the vent apertures and the configuration of the first and second bias flaps allow for venting to occur when deployment of the cushion, in a first direction is prevented by the biasing device.

Accordingly, the lateral venting apertures are disposed on the inboard and outboard sides of the inflatable cushion, which allows for airbag venting to occur when the inflating cushion is restrained by the biasing device of the present disclosure. FIG. 4 illustrates possible locations of the venting apertures. It is contemplated that at least two venting apertures are used with the biasing device and the number and location of the side venting apertures can vary as long as the venting aperture provides lateral venting of the airbag when the biasing device restricts it. One contemplated location is along the side walls of the airbag so that when the inflating airbag is in the position illustrated in FIG. 4 and the biasing device is restraining the airbag venting air flow in the direction of arrows 68 is most easily achieved.

When the overlapped portion of the biasing device is unrestricted the airbag is free to deploy in a manner which is only restricted or retarded by the dimensions of the cushion and the slight resistance of the un-restrained biasing device. If this occurs the venting of the inflatable cushion will occur later in time with respect to the generation of the inflation signal and at a lesser flow rate than the scenario wherein the biasing device interacts with the inflating cushion.

The free edges of the bias flaps overlap each other to define the overlapped portion which preferably extends laterally across an entire lateral length of the biasing device (e.g., outboard to inboard side). As shown in FIG. 4, the biasing device is in a closed condition and the airbag is in an inflated condition. The free edges of the bias flaps are each straight, to form a uniform edge. Thus, the overlapped portion is equal on the inboard side and the outboard side.

In an exemplary embodiment, the width (cross car) of the biasing flaps and the corresponding overlapping portion is approximately the same width as the housing (cross car) of the airbag module. Of course, the width of the biasing flaps may be greater or less than the aforementioned lengths. For example, the width and length of the flaps can vary according to the instrument panel characteristics and/or airbag cushion shape.

After the airbag cushion is folded and secured to the module the free ends of the biasing flaps are overlapped. It is also noted that as the cushion is folded within the housing portions of the biasing flaps may be interwoven with the cushion or alternatively all of the necessary material of the biasing flaps is disposed on top of the cushion or a combination of folding schemes may be employed. The overlapped portion is positioned on top of the un-inflated airbag and comprises a sufficient amount of material to allow partial inflation of the airbag without separation of the biasing flaps. In an exemplary embodiment the amount of material comprising the overlapping portion prior to inflation is folded over the top of the un-inflated airbag as necessary. A portion of the overlapping area can be tacked or sewn together by breakaway stitching and the loose fabric of the overlapped portion is tucked under itself as necessary to bring it to the size of the housing. Alternatively, the flaps may just be folded over and tucked in without any stitching or temporary securement means.

Figure 5:
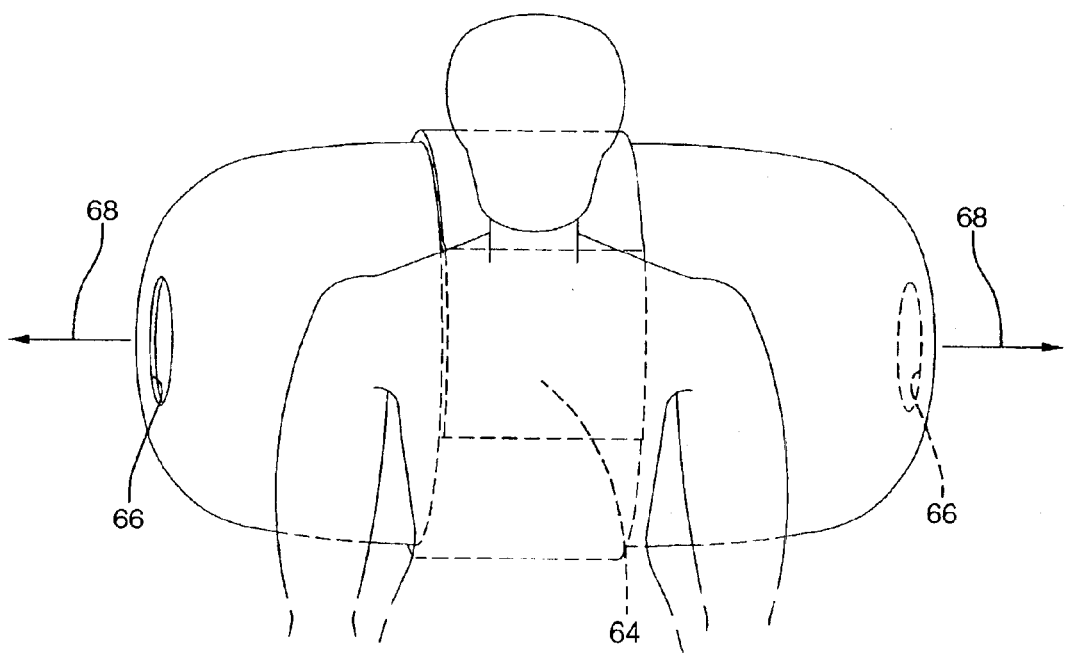
FIG. 5 is a front view of a deployed airbag having side vent apertures and being restrained by a biasing device.

Upon generation of gas by the inflator, the airbag begins to inflate. Referring now to FIG. 5 when a passenger side occupant is in a position to make contact with the overlap portion as the airbag is inflating the occupant prevents the free edges of the biasing device to pull away from each other and the inward (towards vehicle seat) excursion of the airbag is restricted and greater lateral (inboard/outboard) deployment is achieved in a generally equal manner wherein the side vents are oriented to provide venting of the inflatable cushion in the direction illustrated by arrows 68.

Thus, the overlapping portion and ends of the biasing flaps comprise an amount of material positioned on top of the inflatable cushion prior to inflation which will allow the airbag to inflate partially without completely moving the biasing flap out of the way thus, and if an occupant is in a position to make contact with the inflating airbag and the biasing flaps are disposed over the inflating airbag the occupant will make contact with the flaps and provide a resistance force to the overlapping flaps preventing their separation thereby causing lateral venting and deployment as discussed herein.

Accordingly, the biasing device reconfigures the airbag deployment characteristics to provide greater lateral deployment (inboard and outboard) while restraining deployment inward (towards vehicle seat) as opposed to a deployment characteristic wherein the airbag encounters no restrictions to maximum deployment other than the dimensions of the cushion.

In addition, and when the biasing device is in its cushion biasing configuration wherein occupant interaction causes the overlap portion to remain intact and venting through apertures 66 happens much earlier and to a greater extent (e.g., flow) during that phase of the airbag cushion deployment. In other words when the cushion is restricted by the biasing device greater lateral deployment lesser inward excursion and greater side venting is achieved at an earlier deployment time (e.g., from initial deployment) than if the cushion was allowed to simply inflate without any restriction from the biasing device.

Thus, and when the airbag is restricted by the biasing device, the airbag will travel the path of least resistance and be biased laterally toward the outboard side and the inboard side of the vehicle and side venting will also occur during an earlier stage of the deployment and rearward excursion of the airbag will be limited.

In an exemplary embodiment, the bias flaps are each rectangular in shape so that the corresponding overlapping portion is also rectangular in shape. The upper and lower flaps are formed of a material similar to the material used for the inflatable cushion. Of course, other types of materials are considered to be within the scope of the present disclosure.

Figure 6:
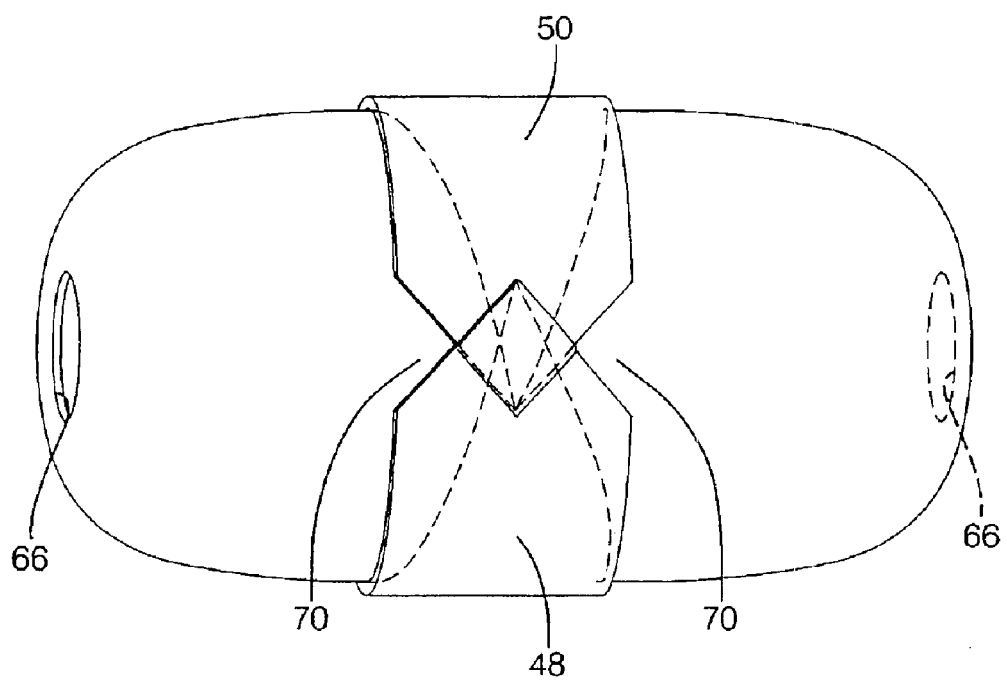
FIG. 6 is a front view of a deployed airbag having side vent apertures and being restrained by an alternative biasing device.

Referring now to FIG. 6 an alternative configuration of the biasing device is illustrated. Here the upper and lower flaps are tapered to provide unrestricted areas 70 at either side of the overlap portion in order to facilitate uniform lateral deployment when the biasing device is restraining the inflatable airbag. Of course, the taper of the upper and lower flaps may have an angular configuration greater or less than those illustrated in FIG. 6. For example, one such taper is illustrated by the dashed lines in FIG. 6 of course, there must be a sufficient amount of material to provide the overlapping portion in order to ensure of the lateral deployment and side venting of the inflatable cushion.

In addition, and as yet another alternative, the upper and lower flaps can be sewn together by a few stitches of an easily broken thread or a few pieces of adhesive tape which are conveniently placed to temporarily hold the upper and lower flaps together.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Furthermore, no element, component, or method step in the present disclosure is intended to be dedicated to the public regardless of whether such material is included in the claims.

What is claimed is:

1. An airbag module for restraining an occupant of a vehicle, comprising:

a housing;

an inflatable cushion being capable of being stored in an un-deployed position in said housing, said inflatable cushion having at least one vent opening disposed on an inboard side and an outboard side of said inflatable cushion, said outboard side being positioned closer to an exterior portion of the vehicle than said inboard side;

an inflator for inflating said inflatable cushion, said inflator being in fluid communication with said inflatable cushion; and a biasing device being configured to restrict the deployment of said inflatable cushion in a first direction while allowing for deployment of said inflatable cushion in an inboard direction and an outboard direction, said outboard direction being towards an exterior portion of the vehicle and said inboard direction being opposite to said outboard direction, said biasing device restricts the deployment of said inflatable cushion when a portion of said biasing device makes contact with the occupant of the vehicle and venting occurs through the at least one vent opening at a higher flow rate than if said biasing device does not make contact with an occupant of the vehicle.

2. The airbag module as in claim 1, wherein said biasing device comprises first and second bias flaps being separate and independent from each other.

3. The airbag module as in claim 2, wherein a portion of the first and second flaps cooperatively define an overlapped portion located atop the cushion such that the inflating cushion is biased towards said inboard direction and said outboard direction when the overlapped portion is restricted.

4. The airbag module as in claim 3, wherein the first and second flaps each have a fixed edge attached to the vehicle and each have a free edge opposite the fixed edge wherein the free edges of the first and second bias flaps overlap each other to define the overlapped portion.

5. The airbag module as in claim 3, wherein the first and second flaps each have a fixed edge attached to the inflatable cushion and each have a free edge opposite the fixed edge wherein the free edges of the first and second bias flaps overlap each other to define the overlapped portion.

6. An airbag module for restraining an occupant of a vehicle, comprising:

a housing;

an inflatable cushion being capable of being stored in an un-deployed position in said housing, said inflatable cushion having at least one vent opening disposed on an inboard side and an outboard side of said inflatable cushion, said outboard side being positioned closer to an exterior portion of the vehicle than said inboard side;

an inflator for inflating said inflatable cushion, said inflator being in fluid communication with said inflatable cushion, said inflator providing an inflation gas for inflating said inflatable cushion after receiving an initiation signal from a sensing and diagnostic module; and a biasing device being configured to restrict the deployment of said inflatable cushion in a first direction while allowing for deployment of said inflatable cushion in an inboard direction and an outboard direction, said outboard direction being towards an exterior portion of the vehicle and said inboard direction being opposite to said outboard direction, said biasing device restricts the deployment of said inflatable cushion when a portion of said biasing device makes contact with the occupant of the vehicle;

wherein said biasing device causes lateral deployment in said inboard direction and said outboard direction and venting through said at least one vent opening on said inboard side and said outboard side of said inflatable cushion at a time after said initiation signal is received by said inflator, said time being shorter than a time it would take for venting to occur through said inboard side and said outboard side if said biasing device does not restrict the deployment of said inflatable cushion and venting occurs through the at least one vent opening at a higher flow rate than if said biasing device does not make contact with an occupant of the vehicle.

7. The airbag module as in claim 6, wherein said biasing device comprises first and second bias flaps being separate and independent from each other.

8. The airbag module as in claim 7, wherein a portion of the first and second flaps cooperatively define an overlapped portion located atop the cushion such that the inflating cushion is biased towards said inboard direction and said outboard direction when the overlapped portion is restricted.

9. The airbag module as in claim 8, wherein the first and second flaps each have a fixed edge attached to the vehicle and each have a free edge opposite the fixed edge wherein the free edges of the first and second bias flaps overlap each other to define the overlapped portion.

10. The airbag module as in claim 9, wherein the first and second flaps are each rectangular in shape and the overlapped portion is also rectangular in shape.

11. A method for modifying the deployment characteristics of an inflatable cushion in a vehicle having an occupant, comprising:

positioning a biasing device about the inflatable cushion in an un-inflated state, said biasing device comprising a first biasing flap and a second biasing flap each overlapping each other to provide an overlapping portion positioned over a portion of the inflatable cushion;

inflating the inflatable cushion with an inflator in fluid communication with the inflatable cushion, said inflator providing an inflation gas for inflating the inflatable cushion after receiving an initiation signal from a sensing and diagnostic module; and restraining the deployment of the inflatable cushion in a first direction while allowing for deployment of the inflatable cushion in an inboard direction and an outboard direction, said outboard direction being towards an exterior portion of the vehicle and said inboard direction being opposite to said outboard direction, said biasing device restricts the deployment of said inflatable cushion when said overlapping portion makes contact with the occupant of the vehicle, said biasing device causes lateral deployment in said inboard direction and said outboard direction and venting through a vent opening in an inboard side and a vent opening in an outboard side of said inflatable cushion at a time after said initiation signal is received by said inflator, said time being shorter than a time it would take for venting to occur through said inboard side and said outboard side if said biasing device does not restrict the deployment of said inflatable cushion and venting occurs through the vent openings at a higher flow rate than if said biasing device does not make contact with an occupant of the vehicle.

12. A biasing device for use with an airbag module having an inflatable cushion with at least one vent opening for restraining an occupant of a vehicle, the biasing device comprising:

a first biasing flap;

a second biasing flap, said first biasing flap and said second biasing flap each being secured to the airbag module at one end and overlapping each other at another end, said first biasing flap and said second biasing flap are disposed about the inflatable cushion when it is stored in the airbag module in an un-inflated state, said first biasing flap and said second biasing flap deploy out of the airbag module prior to the inflatable cushion and the at least one vent opening is unblocked by the biasing device; and wherein said first biasing flap and said second biasing flap restrict the deployment of the inflatable cushion in a first direction, when a portion of the biasing device makes contact with the occupant of the vehicle prior to the inflatable cushion being fully inflated while allowing for deployment of the inflatable cushion in an inboard direction and an outboard direction, said outboard direction being towards an exterior portion of the vehicle and said inboard direction being opposite to said outboard direction and venting occurs through the at least one vent opening at a higher flow rate than if said biasing device does no make contact with an occupant of the vehicle.

13. The biasing device as in claim 12, wherein a portion of the first and second biasing flaps cooperatively define an overlapped portion located atop the inflatable cushion such that the inflating inflatable cushion is biased towards said inboard direction and said outboard direction when the overlapped portion is restricted by the vehicle occupant.

* * * * *